April 16, 1929.  S. E. CERVA  1,709,461
BEARING FOR SPOOL SHEAVES AND ROLLERS
Filed Dec. 22, 1925
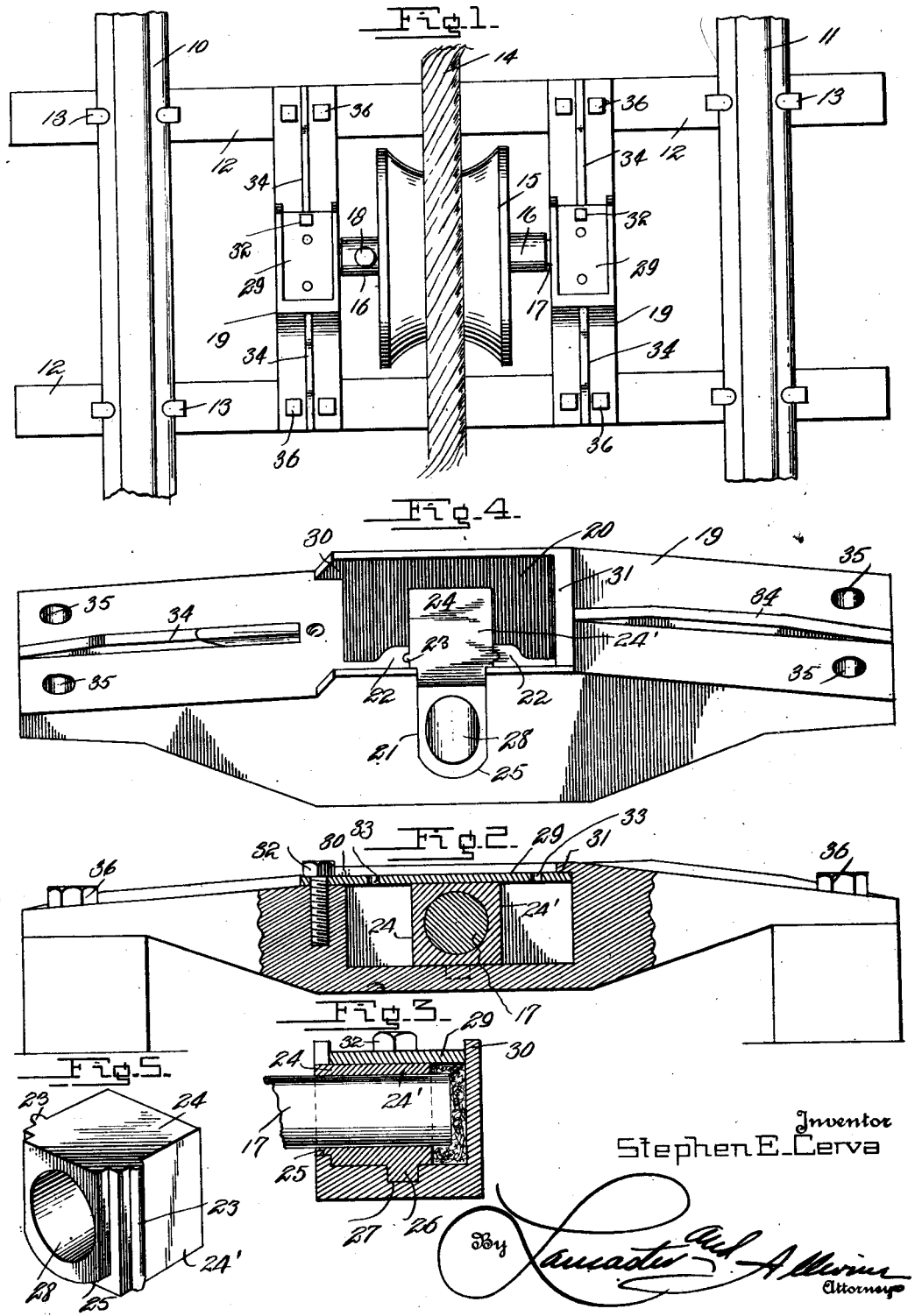
Inventor
Stephen E. Cerva Patented Apr. 16, 1929.

1,709,461

UNITED STATES PATENT OFFICE.

STEPHEN E. CERVA, OF LATROBE, PENNSYLVANIA.

BEARING FOR SPOOL SHEAVES AND ROLLERS.

Application filed December 22, 1925. Serial No. 77,114.

The present invention relates to bearings, and more particularly to a bearing designed for supporting the ends of a shaft or the like.

An object of the present invention is to provide a journal bearing for supporting a shaft or the like which is subjected to heavy weight and strain, and which is also subjected to dust, grit, and is employed in places where the bearing is exposed to moisture and the like.

A further object of the invention is to provide a bearing with an enclosed box adapted to support a quantity of absorbent material for holding a lubricant, and to detachably mount in the box a bearing block or bushing for directly supporting the shaft and which may be supplied with the lubricant from the box.

The invention aims to provide a journal bearing adapted particularly for use in rope haulage systems for mining coal cars and to provide a bearing which may be used in pairs and secured in the middle of the track to support a pulley or the like over which the hauling rope is supported.

A still further object of the invention is to provide a journal bearing of this type which is of sturdy construction, and which may be economically manufactured and easily applied to the ties of the track without the exercise of any great amount of skill.

The above and various other objects and advantages of this invention will in part be described in, and in part be understood from the following detailed description of the present preferred embodiment, the same being illustrated in the accompanying drawing, wherein:

Fig. 1 is a fragmentary top plan view of a track for a mining car equipped with pulley supporting bearings constructed according to the present invention.

Fig. 2 is an enlarged longitudinal section taken through one of the journal bearings.

Fig. 3 is a transverse section taken through the central portion of the same.

Fig. 4 is a perspective view looking into the top of the journal bearing with the cover removed, and Fig. 5 is a detail perspective view of the bearing block or bushing employed.

Referring to the drawing 10 and 11 designate a pair of rails of a track such as is used for mining cars, and the rails are supported by ties 12 which are arranged across the undersides of the rails and secured thereto by spikes 13 or the like in the usual manner.

A rope or cable 14 is arranged lengthwise between the rails 10 and 11 and is used for hauling mine cars over the track, the cable 14 being supported upon idler pulleys 15 or the like having sleeve hub portions 16 which are mounted upon a shaft 17 and secured thereto by a set screw 18.

The improved bearings are utilized for supporting the opposite ends of the shaft 17, and in each bearing comprises a body portion 19 in the form of an elongated bar which is reduced in height at opposite ends to lie across the ties 12 with the body portion of the bar 19 suspended between the ties. The central or body portion of the bar is relatively deep and is hollowed out to provide a lubricant receiving compartment 20 into which may be placed a quantity of wool waste saturated with oil. The inner wall of the bar 19 is provided with a vertical slot 21 which opens through the top thereof and extends downwardly to a point short of the bottom of the compartment or chamber 20. The inner side of said inner wall is provided with a pair of inwardly projecting ribs 22 provided upon their inner opposite faces with vertical grooves for the reception of outstanding vertical beads 23 formed upon the opposite sides of the main body portion 24' of a bearing block 24, the block also including a lateral projection 25 which fits in the slot 21. The block 24 is provided upon its lower side and near its inner end with a depending stud 26 which enters a recess 27 of corresponding shape in the bottom wall of the chamber 20 to anchor the bearing block 24 and hold it against lateral swinging motion.

The block 24 is provided with a bearing opening 28 through which the end of the shaft 17 projects and within which the shaft is supported. The rear end of the block 24 is open, or the bearing opening 28 extends entirely through the block so that the oil contained in the chamber 20 may be constantly fed to the shaft 17 and the wall of the bearing opening 28.

In order to hold the bearing block 24 in place, and to prevent foreign substances from entering the chamber 20, a cover plate 29 is provided, the same comprising a flat sheet of metal arranged to fit over the upper side of the bearing block 24 between the upstanding flanges 30 of the front and rear walls of the chamber 20, and which at one end engages beneath a lip 31 projecting inwardly from one lateral edge of the chamber 20. The other end of the cover plate 29 overlaps the upper face of the body bar 19 and a screw 32 or the like is removably secured downwardly through the said end of the cover plate and into a threaded opening formed in the body bar. The cover plate 29 has one or more openings 33 therein through which oil may be introduced to the chamber 20.

The body bar 19 may be provided on its upper side with raised reinforcing ribs 34, and is provided at its opposite ends with pairs of openings 35 for the reception of bolts 36, spikes or other suitable fastening means engageable with the ties 12.

As shown in Fig. 1, a pair of these journal bearings is secured across adjacent ties 12 for supporting the opposite ends of the shaft 17. When the bearing blocks 24 are worn, it is only necessary to remove the cover plates 29 and substitute new bearing blocks in the chambers 20. The lubricant may of course be loosely placed in the chamber 20 as it is held therein by the walls of the chamber and by the bearing block 24. The lubricant is thus automatically fed to the shaft 17 through the inner open end of the bearing block 24.

Various changes and modifications may be made in the details of construction and design of the above specifically described journal bearing without departing from the spirit of this invention, all changes being restricted only by the scope of the following claims.

What is claimed is:

1. A journal bearing comprising a body bar having a chamber formed downwardly at its intermediate portion and having a vertical slot opening upwardly through the inner wall of the chamber, said inner wall having at its inner side a pair of grooved ribs disposed at opposite sides of the slot, a relatively small bearing block slidably engaging at its outer end in said slot and extending into said chamber, said bearing block having beads disposed vertically at opposite sides for slidable engagement in said grooves and provided with a depending stud at its inner end, the body wall at the bottom of said chamber having a depression therein to receive said stud and anchor the block against lateral movement, a cover plate extending across the top of said block and said chamber, said body having a lip overhanging one side of the chamber and engaging over one end of said cover plate, and detachable securing means carried by the body for engaging the other end of said plate.

2. A journal bearing comprising a body bar having a chamber formed downwardly at its intermediate portion and having a vertical slot opening upwardly through the inner wall of the chamber, said inner wall having at its inner side a pair of grooved ribs disposed at opposite sides of the slot, and a bearing block slidably engaging at its outer end in said slot and extending into said chamber, said bearing block having beads disposed vertically at opposite sides for slidable engagement in said grooves.

3. A journal bearing comprising a body bar having a chamber formed downwardly at its intermediate portion and having a vertical slot opening upwardly through the inner wall of the chamber, said inner wall having at its inner side a pair of grooved ribs disposed at opposite sides of the slot, and a bearing block slidable in said chamber, and having beads disposed vertically at opposite sides for slidable engagement in said grooves and provided with a depending stud at its inner end, the body wall at the bottom of said chamber having a depression therein to receive said stud and anchor the block against lateral movement.

4. A journal bearing comprising a body bar having a chamber formed downwardly at its intermediate portion forming a lubricant receiving compartment and having a vertical slot opening upwardly through the inner wall of the chamber and extending short of the bottom of the chamber, said inner wall having at its inner side a pair of ribs disposed at opposite sides of the slot, and a bearing block including a main body portion in said chamber, slidable between said ribs and a projection fitting said slot.

5. A journal bearing comprising a body bar having a chamber formed downwardly at its intermediate portion and having a vertical slot opening upwardly through the inner wall of the chamber and extending short of the bottom of the chamber, and a depression in the bottom of the chamber, and a bearing block including a main body portion in said chamber and having a stud fitting in said depression, and a lateral projection fitting said slot.

STEPHEN E. CERVA.